Patented July 18, 1950

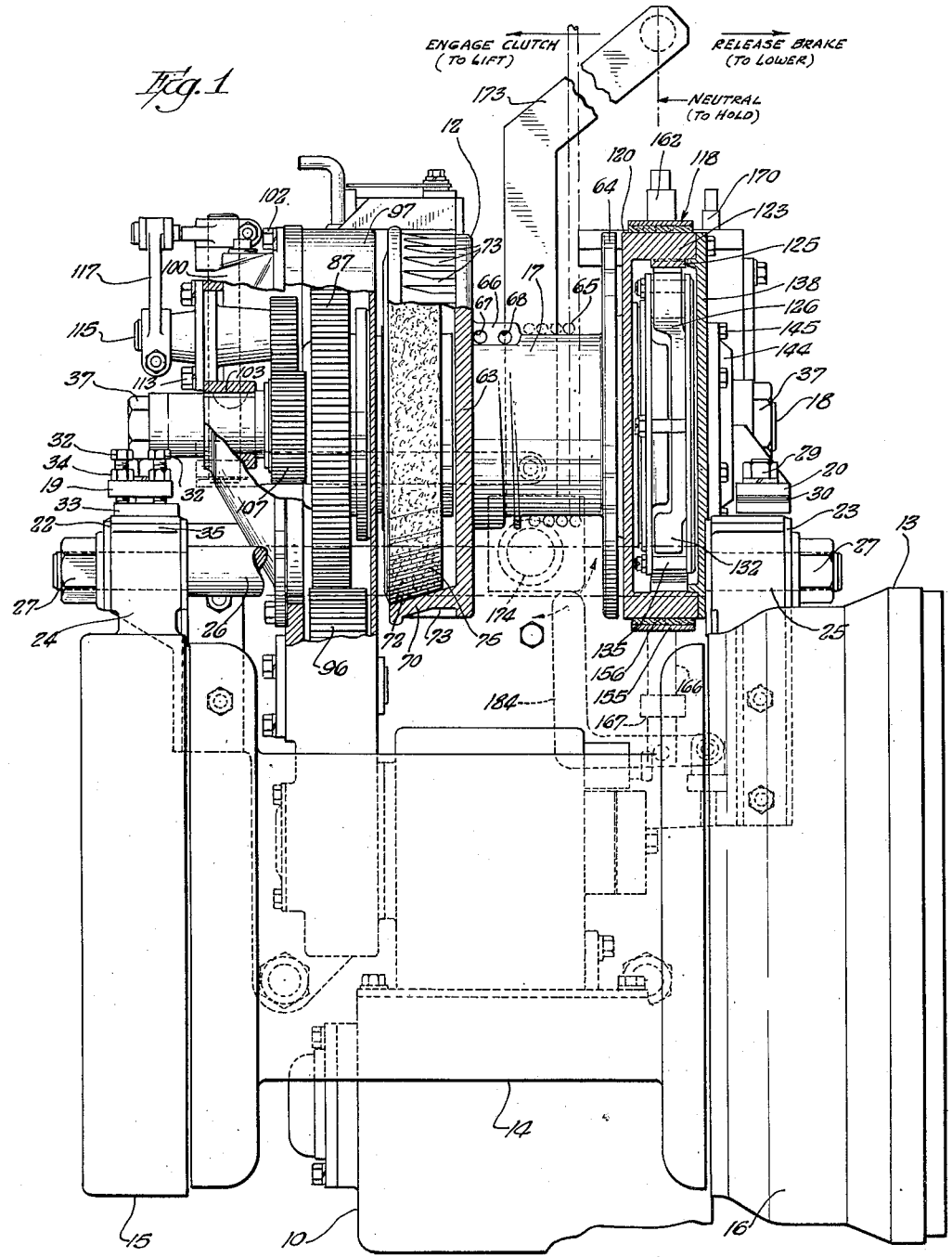

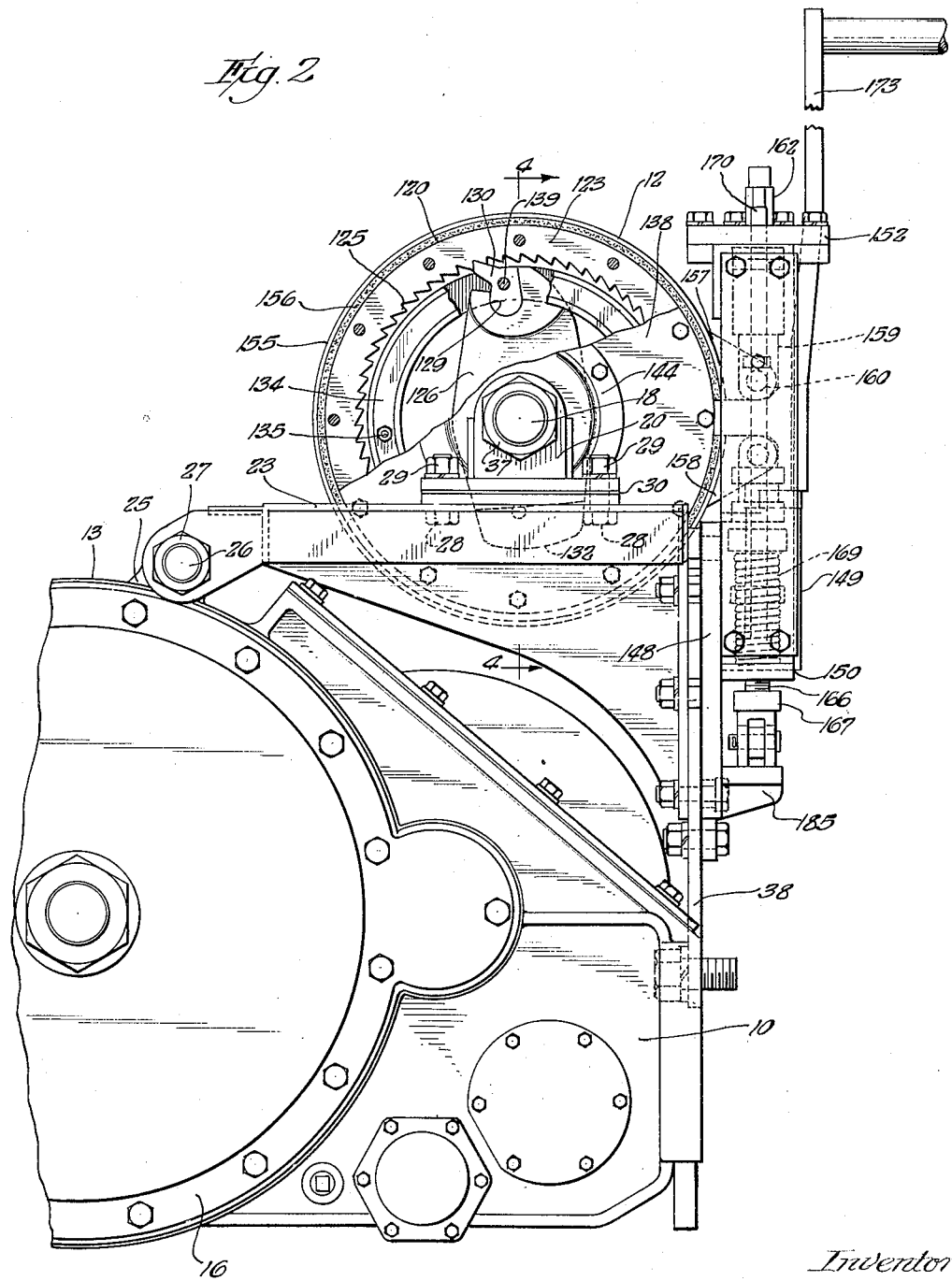

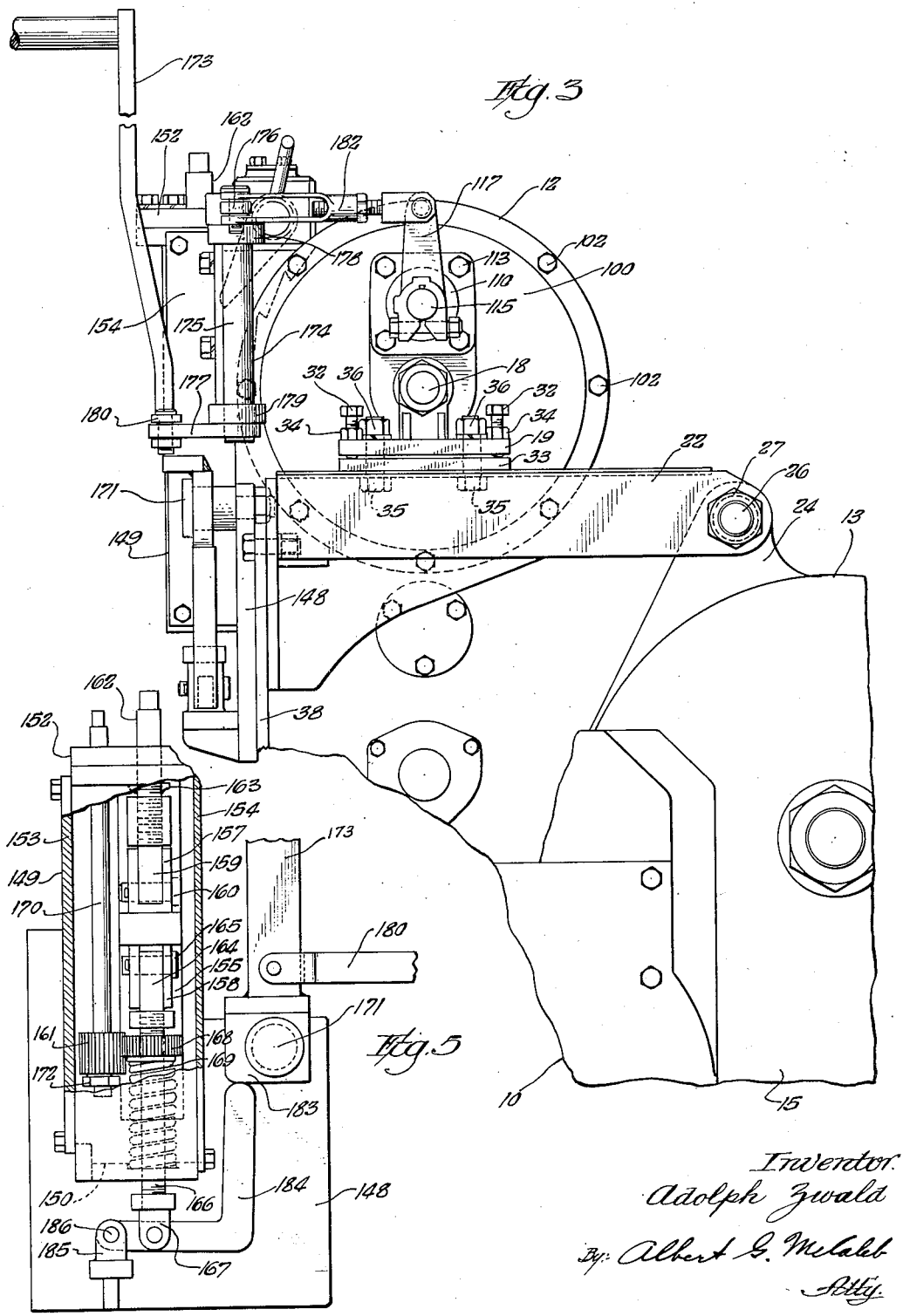

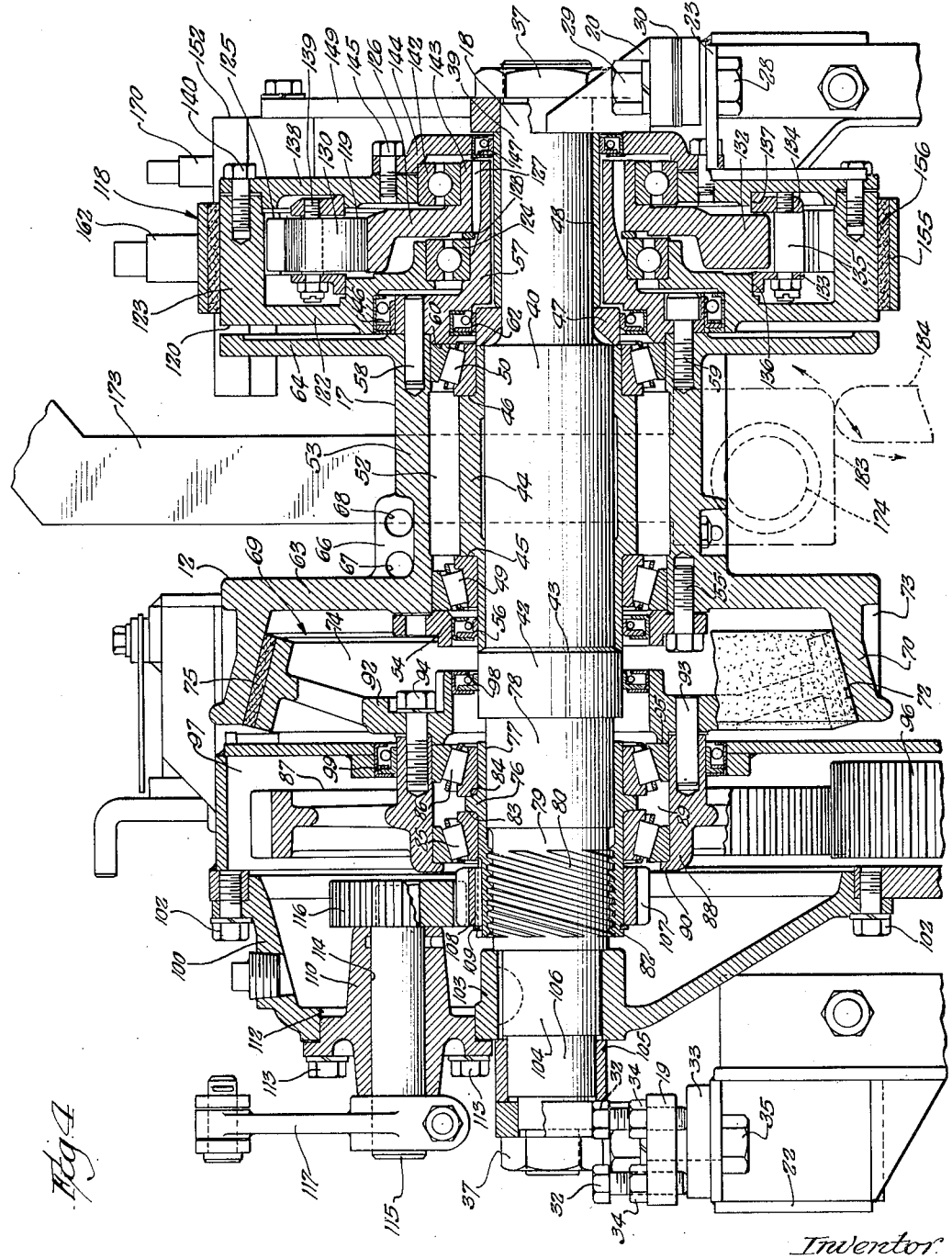

2,515,434

UNITED STATES PATENT OFFICE 2,515,434

CONTROL MECHANISM FOR WINCHES AND THE LIKE

Adolph Zwald, Portland, Oreg., assignor to Hyster Company, Portland, Oreg., a corporation of Oregon Application September 14, 1946, Serial No. 697,105

1 Claim. (Cl. 254—187)

My present invention relates to control mechanisms for winches and the like and more particularly to such mechanisms suited to use in instances, such as the lifting of loads, wherein the force against which the winch is operated by motivating means tends to drive said winch in a direction opposed to that of the motivating means and is utilized for effecting the desired movement in the latter direction.

In the control of lifting winches and the like, prior structures have included a clutch for controlling the application of lifting force to the winch and brakes have been used to hold the load in a raised position or control the rate at which the load is lowered. In such installations, it has been necessary for the motivating force, applied through the clutch, and the braking force to be utilized in opposition in order to stop the load at a desired level without allowing it to fall and also to start upward movement of a load from an elevated position without having it fall for a distance while being started. Such opposed operation of the brake and the motivating force applied through the clutch not only wears both the clutch and the brake, but also generates undesirable heat in both units which must be dissipated.

This invention has for an object the provision of a control mechanism for winches and the like which provides ease and smoothness of the control of a load without necessitating the opposed actions of a brake and a winch-motivating force.

As another object my invention comprehends the provision of a control mechanism for lifting winches and the like which is positive in its action and minimizes the possibility of dropping the load an appreciable amount when it is stopped at a desired level or when it is raised from one level to another.

For a further object the invention contemplates the provision of a control mechanism for winches and the like which includes a clutch for controlling the application of driving power to the winch for effecting its movement in one direction and a brake for controlling movements of the winch in the opposite direction, which clutch and brake are separately operable in producing the control.

Another object of this invention is to provide a control mechanism for winches and the like which has the characteristics set forth in any of the preceding objects, and wherein both the clutch and the brake are controlled by a single movable element without overlapping of their controlling functions or effects and without the necessity of delicate adjustments.

Other objects and advantages of the invention will be apparent from the following description and the accompanying drawings, in which similar characters of reference indicate similar parts throughout the several views.

Referring to the four sheets of drawings accompanying the specification,

Fig. 1 is a rear elevational view of a dual winch structure embodying a preferred form of my control mechanism and has portions cut away to illustrate certain parts of the internal construction;

Fig. 2 is a side elevational view of the winch structure shown in Fig. 1 and also has parts cut away to depict portions of the internal construction;

Fig. 3 is a fragmentary side elevational view of the structure shown in Figs. 1 and 2 and is taken from the side opposite that shown in Fig. 2;

Fig. 4 is a fragmentary sectional view of a portion of the structure shown in Figs. 1, 2 and 3, drawn to a larger scale so as to illustrate more fully certain details of my preferred form of control mechanism, wherein the section is taken substantially on a line 4—4 of Fig. 2; and Fig. 5 is a fragmentary front elevational view depicting a portion of my preferred form of control mechanism and has parts cut away to show details of internal construction.

Considered generally, the dual winch structure, which is disclosed herein for illustrative purposes, embodies a gear box 10 which houses series of gears for transmitting driving force from a prime mover, such as the engine of a tractor, to each of two winches 12 and 13. The winch 13 includes a winding drum 14 rotatably supported between end housings 15 and 16 and is adapted to uses such as towing. The winch 12 includes a winding drum 17 rotatably supported by a shaft 18 (Fig. 4) which has its ends secured to and supported by end support brackets 19 and 20. The support brackets are respectively carried by arms 22 and 23 which each have an end secured to the top of the gear box and extend rearwardly therefrom with their other ends secured to brackets 24 and 25, respectively, on the end housings 15 and 16 of the winch 13. The extending ends of the arms 22 and 23 are laterally braced at the brackets 24 and 25 by a tie rod 26 extending therethrough and secured by fastening means, such as nuts 27, on its opposite ends.

The bracket 20 is removably secured to the arm 23 by fastening means, such as bolts 28 and co-operating nuts 29. The position of the bracket relative to the arm 23 may be effectively adjusted by the use of shims 30 interposed therebetween. The other end support bracket 19 is desirably supported for ready adjustment relative to the arm 22 so that the alignment of the shaft 18 and the coacting parts carried thereby may be easily adjusted. For this purpose a plurality of adjusting screws 32 are threaded into the base portion of the bracket and have their ends abutting a plate 33 secured to the arm 22. Each of the adjusting screws is provided with a lock nut 34 for securing it in adjusted position. The adjusting screws 32 are set to a position for effecting a desired alignment of the shaft 18, while anchor bolts 35 are loosened. Those anchor bolts extend through the arm 22, plate 33, and the base portion of the bracket 19, and are provided with nuts 36 which secure the bracket 19 in its adjusted position relative to the arm 22. Each end of the shaft 18 is secured in position relative to one of the brackets by a nut 37 threaded onto an end portion of the shaft.

In the disclosed embodiment of my invention, the dual winch structure is adapted to be mounted in a fixed position, as at the rear of a tractor, in which position power for operating the winches is connected to the gears within the gear box 10 through a suitable coupling (not shown) from the customary power take-off connection on the tractor. In the present instance, a front face plate 38 on the gear box 10 is mounted adjacent the rear of the tractor.

Each of the winches 12 and 13 desirably has a separate control mechanism for controlling its operation. Since my disclosed control mechanism is particularly adapted to the control of winches utilized for raising and lowering loads by the winding and unwinding of a cable on a winding drum, I have shown its application in the present instance to the auxiliary winch 12.

As illustrated in Fig. 4, the shaft 18 has portions of various diameters intermediate its ends for supporting the various parts of the winch 12 and locating those parts relative to one another longitudinally of the shaft. As viewed in Fig. 4, the shaft 18 has a portion 39 of predetermined diameter and longitudinal extent at its right hand end. Adjacent the portion 39 is a portion 40 of larger diameter which extends axially of the shaft to an integral portion 42 of still larger diameter which serves as an intermediate abutment ring having a shoulder 43.

A bearing spacing sleeve 44, which has axially displaced and oppositely disposed radial shoulders 45 and 46 intermediate its ends, fits onto the portion 40 of the shaft and is located thereon by the abutment of its end against the shoulder 43. A ring 47 and a sleeve 48 mounted on the end portion 39 of the shaft hold the spacing sleeve 44 in place axially of the shaft and are in turn secured in position by abutment against the inner face of the bracket 20. Reversely disposed thrust roller bearings 49 and 50 are mounted on the end portions of the spacing sleeve 44 with their inner races abutting the shoulders 45 and 46, respectively. Those bearings 49 and 50 fit into the ends of an axial opening 52 through the hub portion 53 of the winding drum 17 and thereby support the winding drum for rotation relative to the shaft 18.

Adjacent the bearing 49, a ring 54 is secured by fastening means, such as cap screws 55, to the end of the hub portion of the drum and extends inwardly in a radial direction to an extent such that it overlaps the outer race of the bearing 49. An oil seal 56 of conventional design is disposed between the ring 54 and the end portion of the spacing sleeve 44 to prevent the escape of lubricant adjacent the bearing 49. The overlapping of the outer race of the bearing 49 by the ring 54 locates the winding drum 17 in one direction axially of the shaft.

At the other end of the winding drum 17 a flanged ring 57 is drivingly connected to the hub portion 53 of the winding drum by a plurality of pins, such as 58, and is secured against the end of the hub portion 53 by fastening means, such as cap screws 59. A shoulder 60 on the flange portion of the flanged ring 57 abuts the outer race of the bearing 50 in opposition to the ring 54, thereby to locate the winding drum in the other direction axially of the shaft. An oil seal 62 is disposed between the ring 47 and the flanged ring 57 to prevent the leakage of lubricant adjacent the end of the bearing 50.

At its opposite ends the winding drum 17 has integral webs 63 and 64 projecting radially from the hub portion 53 to define a channel in which a cable, such as that indicated in dot and dash lines at 65 in Fig. 1, is wound during the operation of the winch. By preference, a lug 66 is integrally formed on the outer surface of the hub portion 53 between the webs 63 and 64 and has openings 67 and 68 therein to facilitate the anchoring of a cable end to the winding drum.

Although other types of engageable and releasable driving mechanisms might be utilized to serve the purpose of providing a controllable driving connection to the winding drum 17, I have illustrated the adaptation of a cone type clutch 69 for this purpose. An integral axially extending flange 70 projecting from the web 63 and having a conical inner surface 72 serves as one frictional element of the clutch 69. Integrally formed pawl teeth 73, which project radially from the outer surface of the flange 70, aid in cooling the frictional surfaces of the clutch. A second and coacting clutch element 74 carries on its outer surface a band of friction material 75 adapted to effect a driving connection with the conical surface 72 and is mounted for axial and rotational movement relative to the shaft 18.

To provide for the axial movement of the clutch element 74, a sleeve 76 has an end portion 77 mounted for axial sliding movement on a portion 78 of the shaft 18 adjacent the intermediate abutment ring portion 42 thereof. Adjacent the portion 78 of the shaft is a portion 79 of smaller diameter which has external threads 80 cut thereon, which threads engage an internally threaded portion 82 at the other end of the sleeve 76. With this structure it may be readily understood that rotation of the sleeve 76 relative to the shaft 18 effects a proportional and uniform movement of the sleeve 76 axially of the shaft.

On its outer surface the sleeve 76 has axially spaced radial shoulders 83 and 84 oppositely disposed intermediate the ends of the sleeve to serve as separators for reversely disposed thrust roller bearings 85 and 86. A gear 87 has a hub portion 88 with an axial central opening 89 therethrough, into which opening the outer races of the bearings 85 and 86 fit to support the gear for rotation relative to the sleeve 76 and shaft 18. At the outer end of the hub portion 88 an integral and inwardly projecting radial flange 90 serves as an abutment for locating the gear axially in one direction relative to the sleeve 76. At the other end of the hub portion 88 of the gear, a hub portion 92 of the clutch element 74 is drivingly secured thereto by a plurality of circumferentially spaced pins, such as 93, and fastening means, such as cap screws 94. A shoulder portion 95 on the hub portion 92 of the clutch element 74 abuts the outer end of the outer race of the bearing 86 to locate the gear in the other direction axially of the sleeve 76. Thus it may be observed that movement of the sleeve 76 axially of the shaft 18 also effects axial movement of the gear 87 and the clutch element 74. The axial movement of the clutch element 74 which is thus produced effects engagement and disengagement of the frictional surfaces of the clutch 69 so as to connect or disconnect the drum 17 from a source of driving force.

As illustrated in Figs. 1 and 4, the gear 87 meshes with a gear 96, which gear 96 is one of a series within the gear box 10 through which driving power is transmitted to the clutch 69 and winding drum 17. An extended housing portion 97 of the gear box 10 serves as a housing for the gears 87 and 96. In order to prevent partial engagement between the gears 87 and 96 when the gear 87 is moved axially of the shaft 18, the gear 96 is desirably of sufficient width to allow for such movement. In order to prevent the escape of lubricant into the clutch 69, an oil seal 98 is disposed between the shaft portion 42 and the hub 92 of the clutch element 74. Another such oil seal 99 is also desirably provided between the hub 88 of the gear 87 and the extended housing portion 97. An end cover 100 is secured to the extended housing portion 97 adjacent the outer ends of the sleeve 76 and gear 87 by removable fastening means, such as cap screws 102, to complete the enclosure of the gears and the clutch actuating mechanism. A flanged bearing portion 103 on the end cover 100 fits a portion 104 of the shaft and is preferably keyed to the shaft to locate the shaft circumferentially and prevent it from rotation. A spacer sleeve 105 fits over a portion 106 of the shaft and is engaged between the bracket 19 and the end cover 100.

In order to control the axial position of the sleeve 76 from outside the enclosure of the clutch actuating mechanism, a gear 107 is secured to the outer surface of the sleeve 76 adjacent the outer end of the gear 87. A key 108 drivingly connects the gear 107 to the sleeve 76 and a snap ring 109 is utilized to lock the gear in position axially of the sleeve.

A flanged bearing block 110 is secured in an opening 112 in the end cover 100 by fastening means, such as cap screws 113, and provides a journal bearing 114 which rotatably carries a shaft 115. On the inner end of the shaft 115, a pinion 116 is mounted in a position to mesh with the gear 107. On the other end of the shaft 115 a lever arm 117 is clamped to the shaft so that movement of the lever arm about the axis of the shaft turns the pinion 116, and in turn rotates the gear 107 and sleeve 76 to effect axial movement of the sleeve which results in engagement or disengagement of the frictional surfaces of the clutch 69, depending upon the direction of movement of the lever arm.

From the foregoing description, it may be understood that power supplied from a prime mover, such as a tractor engine, is applied to the winding drum 17 through a suitable driving mechanism, such as a series of gears which, in the present instance, includes the gears 96 and 97. The driving force thus applied to the winding drum is utilized to wind the cable 65 around the drum, whereby a load may be lifted or other useful work accomplished. The application of such driving force to the winding drum is under the control of an operator and is effected by movement of the lever arm 117.

At this point it may be realized that when the frictional elements of the clutch 69 are disengaged, the winding drum 17 is free to rotate relative to the shaft 18 as a result of force applied through the cable 65 by a lifted load or the like if there were nothing to restrain such movement of the winding drum. In the disclosed structure I have provided the friction brake mechanism 118 for preventing or variably restraining rotation of the winding drum in a direction opposed to that in which it is turned by the power applied through the clutch 69. In addition to merely applying braking force for preventing or controlling movements of the winding drum 17 when driving force is not applied thereto, I have incorporated in the brake mechanism a unidirectional drive 119 which allows relatively free rotation of the drum at any time in the direction of the driving force applied through the clutch and prevents or controllably restrains the movement of the winding drum in the opposite direction.

The brake mechanism 118 includes a brake drum 120 which has a radially extending web portion 122 and a cylindrical drum portion 123. The brake drum is supported for relatively free rotation with respect to the winding drum 17 by an anti-friction bearing 124 mounted between the flanged ring 57 and the web portion 122 of the brake drum. As shown in Figs. 2 and 4, the internal surface of the cylindrical drum portion 123 is provided with ratchet teeth 125.

A pawl carrying part 126 is mounted upon the end of the flanged ring 57 and is drivingly connected thereto by a key 127. A resilient snap ring 128 fits into a groove on the flanged ring 57 to hold bearing 124 in place and is disposed between the pawl carrying part 126 and the outer race of the bearing 124 to separate the pawl carrying part from the web portion of the brake drum in a direction axially of the shaft.

As shown in Fig. 2, the pawl carrying part 126 is desirably elongated in a direction lateral to the shaft 18 and has at one end a socket 129, the inner end of which is of circular contour and carries a pawl 130 for limited rotational movement. The limits of rotational movement of the pawl 130 are defined by the outer end surfaces of the socket 129 and the contour of the supporting pawl; such limits being sufficient to permit movements of the pawl to positions in which it fully engages the ratchet teeth 125 or is completely disengaged therefrom. An end 132 of the pawl carrying part 126 extends away from the shaft in a direction opposite to the pawl carrying end thereof so as to provide a counterbalance.

Although a spring or other suitable mechanism might be utilized for controlling the operation of the pawl to effect its engagement and disengagement with the ratchet teeth 125, I prefer to use the disclosed pawl actuating mechanism which might be termed a friction operated mechanism. This friction operated mechanism comprises two rings 133 and 134 held in axially spaced relationship by a plurality of circumferentially separated spacer studs 135 and carried for rotational movement by bearing shoulders 136 and 137, respectively, on the inner surface of the brake drum web portion 122 and the opposed inner surface of an end cover plate 138.

The pawl 130 is movably connected to the rings 133 and 134 at a position outwardly of the axis of its rotational movement in the socket 129 by a connecting stud 139. During clockwise movement of the winding drum 17 and the pawl carrying part 126 which is drivingly connected thereto, as viewed in Fig. 2, the inertia of the rings 133 and 134 tends to cause those rings to lag behind the pawl carrying part, which tendency urges the pawl 130 in a counterclockwise direction to a position out of engagement with the ratchet teeth. The winding drum is thus free to move in one direction without opposition by the brake mechanism. However, when the pawl carrying part 126 moves in a counterclockwise direction, as viewed in Fig. 2, the rings are shifted in a clockwise direction relative to the pawl carrying part thereby to urge the pawl into engagement with the ratchet teeth 125 so that the pawl carrying part is effectively locked to the brake drum.

To provide an enclosure for the uni-directional drive and the bearings associated with the brake mechanism, the end cover plate 138 is removably secured to the outer end surface of the cylindrical portion 123 of the brake drum by fastening means, such as cap screws 140, and extends inwardly therefrom in a radial direction. A second anti-friction bearing 142 is mounted between a flange 143 on the pawl carrying part 126 and the cover plate 138 to provide additional support for the brake mechanism and uni-directional drive. The bearing 142 is axially secured in place by an auxiliary cover plate 144 which is secured to the outer surface of the cover plate 138 by fastening means, such as cap screws 145. An oil seal 146 is disposed between the flanged ring 57 and the web portion 122 of the brake drum to prevent the leakage of lubricant from one end of the brake mechanism. At the other end lubricant leakage is prevented by an oil seal 147 which is disposed between the sleeve 46 and the auxiliary cover plate 144.

At the front of the disclosed winch structure a plate 148 is secured to the upper portion of the face plate 38 and has secured to its outer surface a housing and support structure 149 which encloses and carries a portion of the brake control mechanism. The housing and support structure 149 includes a base 150 which is secured to the outer surface of the plate 148 and projects outwardly therefrom. At its top and spaced from the base 150, the housing and support structure includes top plates 152. Extending between the base 150 and top plates 152 are removable side plates 153 and 154.

The major portion of the outer cylindrical surface of the brake drum 120 is encircled by a brake band 155 which has a lining 156 of frictional material secured to its inner surface for effectively gripping the outer surface of the brake drum in proportion to the pressure applied to the brake band. As depicted in Figs. 2 and 5, yokes 157 and 158 are secured to the ends of the brake band 155 and are normally disposed in spaced relationship relative to one another at one side of the brake mechanism and within the housing and support structure 149. The yoke 157 has a threaded block 159 movably secured thereto by a pin 160.

A shaft 162 extends through and is rotatably carried by the top plates 152 of the housing and support structure and has its inner end threaded into the block 159. A flange 163 on the shaft 162 abuts the inner surface of the top plates axially to locate the shaft so that rotation thereof adjusts the position of the yoke 157 relative to the top plates and thereby serves as an adjustable anchor for one end of the brake band.

A block 164 is connected to the yoke 158 at the other end of the brake band by fastening means, such as a pin 165. A shaft 166 has one end threaded into the block 164 and its other end threaded into a bifurcated coupling 167 so that the distance between the coupling 167 and the block 164 may be adjusted by turning the shaft 166 relative to either the block 164 or the coupling 167, or both. A gear 168 is threaded onto the shaft 166 between the block 164 and the coupling 167. Also, intermediate the block 164 and the coupling 167, the shaft 166 extends through the base 150 of the housing and support structure 149 and is axially movable relative thereto. A compression spring 169 surrounds the mid-portion of the shaft 166 and is disposed between the gear 168 and base 150 so that it exerts force on the brake band, causing the frictional lining 156 to grip the brake drum. The force thus normally applied to the brake band is controlled by the size of the spring 169 and the position of the gear 168 which determines the normal compression of the spring.

In order to effect adjustment of the compression of the spring 169 from outside the housing and support structure 149, a shaft 170 is rotatably supported by a bracket 172 within the housing and support structure and extends outwardly through the top plates 152. A gear 161 is mounted on the shaft 170 and meshes with the gear 168 so that rotation of the shaft 170 effects movement of the gear 168 longitudinally of the shaft 166. The width of the gear 161 is sufficient to allow for normal longitudinal movement of the gear 168 without disengagement of the gear teeth.

With the brake control structure thus arranged, the brake is normally applied by the action of the compression spring 169 so that its normal tendency is to resist any movement of the winding drum 17 in the direction opposite to that in which it is driven by the power source. Due to the action of the uni-directional coupling between the brake mechanism and the winding drum, the brake does not resist movements of the winding drum which are effected by the application of driving force thereto. The normal force applied to the brake by the compression spring 169 is preferably sufficient to prevent downward movement of any normal load which is lifted by the winch.

Since the brake resists only the movements of the winding drum which are opposed in direction to those effected by the application of power, the development of heat due to brake friction is minimized, since it is unnecessary for the brake to be applied as the power is released in order to stop the load at a desired position. The load may also be stopped at a desired position without the development of any particular skill in applying the brake as the clutch is released. In lifting a load, it is also unnecessary for the clutch to be engaged as the brake is released in order to start the upward movement of the load. This prevents undue wear on both the clutch and brake surfaces as well as preventing the undue development of heat in both the brake and clutch.

In order further to provide for simplified operation of the winch and to insure the proper sequence of operations in its control, I have provided for the control of both the clutch 69 and the brake mechanism 118 by a single manually operable control instrumentality which, in the present instance, is a lever 173. A stud 171 carried by the plate 148 supports the lever 173 for swinging movement in either of two directions from the normal or neutral position thereof which is depicted in Fig. 1. In my preferred construction and arrangement of the parts, the clutch 69 is disengaged and the brake is applied by the action of the compression spring 169 to its full extent when the lever 173 is in the neutral position. From this starting position power is applied to the winding drum for effecting its movement in one direction by moving the lever 173 in one direction from the neutral position. Movement of the lever in the opposite direction from its neutral position varies the brake action to control the lowering movement of a load.

For effecting control of the clutch operation upon movement of the lever 173 in one direction, I have provided links and a crank through which the lever 173 is operably connected to the lever arm 117. Referring to Figs. 3 and 5, a crank 174 includes a shaft 175 and angularly disposed crank arms 176 and 177 secured to opposite ends of the shaft. Lugs 178 and 179 on the winch housing rotatably support the shaft 175. A link 180 extends between and movably connects the crank arm 177 to the lever 173 at a position displaced from the axis of the stud 171 so that movement of the lever 173 turns the crank and swings its arms. An adjustable link 182 movably connects the crank arm 176 to the lever arm 117 so that the swinging movement of the crank, which is effected by movements of the lever 173, effects engagement and disengagement of the clutch 69. The adjustment and arrangement of parts are such that the clutch is disengaged when the lever 173 is in its neutral position and moves farther away from its engaged position when the lever 173 is moved to a position for effecting release of the brake 118.

As shown in Fig. 5, the lower end of the lever 173 comprises a cam 183 which is turned about the axis of the stud 171 when the lever 173 is moved. A bell crank 184 has one end supported for swinging movement by a bracket 185 which is secured to and projects from the plate 148. The bifurcated coupling 167 on the end of the brake actuating shaft 166 is also movably connected to the bell crank 184 at a position near the bracket 185. The other end of the bell crank engages the cam 183, which cam has a surface contour such that movement of the lever 173 in one direction from its neutral position moves the bell crank 184 about the axis of a pin 186 by which it is connected to the bracket 185 and thereby moves the brake control shaft 166 against the force of the spring 169 to vary the braking effort.

It may now be readily understood that, in addition to the previously mentioned features of my winch control mechanism, it is also suited to ease of effective control by the manual operation of a single movable element, which element effects engagement of the clutch 69 to apply power to the winding drum when moved in one direction from a neutral position and variably controls the braking effort in accordance with the desire of an operator during the lowering of a load when moved in the other direction from its neutral position.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim as new and desire to secure by Letters Patent of the United States, is:

In a control mechanism for winches and the like which is adapted to simplified manual control with minimized friction loss and wear for the raising and lowering of loads by the winding and unwinding of cable relative to a cable winding drum, and wherein a friction clutch having normally disengaged parts and a friction brake drum are separately and coaxially supported for independent rotation relative to a common shaft, one of said clutch parts is movable axially of the shaft to and from driving engagement with the other part, while said other part is drivingly secured to the cable drum, and a brake band is normally biased into holding engagement with the brake drum, the combination comprising a ratchet mechanism providing a uni-directional holding connection between the cable and brake drums so that the cable drum is prevented from rotation in one direction relative to the brake drum and is rotatable in the other direction with relative freedom with respect to the brake drum even though the brake drum is held by the brake band, a unitary control lever having a neutral position and mounted for movement in opposite directions from the neutral position, a connecting mechanism including a sleeve threaded for axial and rotational movement relative to said shaft and carrying the movable clutch part, a pinion shaft and pinion for effecting movements of the sleeve and movable clutch part, and a series of links connecting the control lever to the pinion shaft so that movement of the control lever in one direction from the neutral position effects driving engagement of the clutch parts, and another mechanism including a cam drivingly connected to the control lever, and another lever actuated by said cam upon movement of the control lever in the other direction for effecting controlled release of the brake band.

ADOLPH ZWALD.

REFERENCES CITED

The following references are of record in the file of this patent:

UNITED STATES PATENTS

| Number | Name | Date |
|---|---|---|
| 2,334,167 | Allin | Nov. 16, 1943 |

FOREIGN PATENTS

| Number | Country | Date |
|---|---|---|
| 21,311 | Great Britain | 1908 |
| 79,549 | Sweden | Feb. 13, 1934 |
| 514,502 | Great Britain | Nov. 9, 1939 |